(12) United States Patent
Deskin

(10) Patent No.: US 6,837,006 B2
(45) Date of Patent: Jan. 4, 2005

(54) PREFABRICATED HOME COVERING

(76) Inventor: James T. Deskin, P.O. Box 672, Osage Beach, MO (US) 65065

(*) Notice: Subject to any disclaimer, the term of this patent is extended or adjusted under 35 U.S.C. 154(b) by 0 days.

(21) Appl. No.: 10/236,919

(22) Filed: Sep. 9, 2002

(65) Prior Publication Data
US 2004/0045223 A1 Mar. 11, 2004

(51) Int. Cl.$^7$ ............................................... B62D 63/08
(52) U.S. Cl. ............. 52/3; 52/23; 52/143; 52/DIG. 14; 52/DIG. 12; 150/154; 150/166; 296/100.01
(58) Field of Search ........................ 52/3, 23, 63, 143, 52/DIG. 14, DIG. 12; 150/154, 166; 270/9.4; 296/98, 100.01, 159; 135/88.01, 90, 115

(56) References Cited

U.S. PATENT DOCUMENTS

| | | | |
|---|---|---|---|
| 1,871,571 A | | 8/1932 | Weber |
| 2,455,237 A | * | 11/1948 | Davis ........................... 410/97 |
| 3,367,347 A | * | 2/1968 | Smith .................... 296/100.18 |
| 3,397,009 A | * | 8/1968 | Landenberger .............. 296/98 |
| 3,521,927 A | | 7/1970 | Barry |
| 3,791,665 A | | 2/1974 | McAvoy |
| 3,880,459 A | * | 4/1975 | Kelley ........................ 296/156 |
| 4,332,265 A | * | 6/1982 | Baker .......................... 296/159 |
| 4,505,512 A | | 3/1985 | Schmeichel et al. |
| 4,691,957 A | | 9/1987 | Ellingson |
| 4,813,734 A | * | 3/1989 | Hoover .................. 296/100.17 |
| 4,923,240 A | * | 5/1990 | Swanson ................ 296/100.18 |
| 5,050,924 A | * | 9/1991 | Hansen .................... 296/100.15 |
| 5,240,756 A | | 8/1993 | Finell et al. |
| 5,299,849 A | * | 4/1994 | Cook et al. ............. 296/100.15 |
| 5,452,973 A | * | 9/1995 | Arvin .......................... 410/118 |
| 5,579,794 A | | 12/1996 | Sporta |
| 5,924,761 A | * | 7/1999 | Harrison ...................... 296/159 |
| 6,106,051 A | * | 8/2000 | Miskowic .............. 296/100.09 |
| 6,209,768 B1 | * | 4/2001 | Boaz .......................... 224/314 |
| 6,224,139 B1 | | 5/2001 | Weyand |

* cited by examiner

Primary Examiner—Carl D. Friedman
Assistant Examiner—Jennifer I. Thissell
(74) Attorney, Agent, or Firm—Richard C. Litman

(57) ABSTRACT

A prefabricated home covering designed to protect a prefabricated home as it is being transported. The prefabricated home covering has a generally rectangular sheet of tarpaulin material used to cover an open middle section of a prefabricated home half being transported. There are also two generally trapezoidal sheets of tarpaulin material used to cover the ends of a prefabricated home half being transported, with the generally rectangular sheet of tarpaulin material and the two generally trapezoidal sheets of tarpaulin material being attached from the bottom of a trailer frame transporting the prefabricated home half with a plurality of rubber straps and D-rings with S-hooks. A plurality of strap buckle assemblies attach the generally rectangular sheet of tarpaulin material to the two generally trapezoidal sheets of tarpaulin material and a plurality of grommets attach the prefabricated home covering to the prefabricated home being transported.

3 Claims, 3 Drawing Sheets

PREFABRICATED HOME COVERING

BACKGROUND OF THE INVENTION

1. Field of the Invention

The present invention relates to a covering that is used to protect a prefabricated home as it is being transported.

2. Description of the Related Art

The prefabricated home industry is an important part of the construction industry. Prefabricated homes are more affordable and are more attractively priced for first-time home buyers. They are unique in the construction industry since the majority of the home is built off of the actual lot where the home is set.

Transportation of a prefabricated home is done in sections and requires the transported home to be protected from the elements as it arrives to its final destination. This and similar protection is also reflected in the related art.

U.S. Pat. No. 1,871,571 issued to Weber, outlines the use of a waterproof covering sheet or tarpaulin. This tarpaulin can be used to cover and protect various objects on both land and sea. These tarpaulins are usually relatively large and are comparatively expensive due to the amount of canvas required for their construction.

U.S. Pat. No. 2,455,237 issued to Davis, outlines the use of a cargo blanket that serves as a cover for protecting and securing cargo on aircraft and other carriers. The cargo blanket is a securing cover which could be extended or reduced to secure loads of different shapes and is amply strong to hold cargo firmly in place.

U.S. Pat. No. 3,521,927 issued to Davis, outlines the use of a flexible polyethylene cover of lightweight construction for an open-topped piggyback trailer, where the cover has draped portions along the four sides, the cover being supported by straps running transversely to the trailer and extending beyond the cover for tie-down connection on the vertical side of the trailer. The straps are connected to the cover using polyethylene strips, with each strip sealed along its side to the cover and confines a given strap.

U.S. Pat. No. 3,791,665 issued to McAvoy, outlines the use of a cover assembly of the type designed for use in combination with house trailers, mobile homes and the like. The assembly is made up of one or more skirt-like structures attached about the lower, outer peripheral portion of a house trailer and is dimensioned to extend from this portion, vertically downward to approximately the supporting surface on which the mobile home is positioned. The skirt structure is made from a flexible open-meshed material capable of allowing air to pass therethrough and be rolled upon itself when removed from the mobile home.

U.S. Pat. No. 4,505,512 issued to Schmeichel et al., outlines the use of a roll-up tarp assembly for an open truck box or trailer. The roll-up tarp assembly includes a tarp made from a flexible material. The tarp is securely attached along one side to the top of the truck securely attached to the top of the truck box. The other side of the tarp is attached to a roll bar by a plurality of flexible straps. A crank apparatus connected to the roll bar by a U-joint and collar assembly is utilized to roll the tubular member transversely of the truck box opening so as to enclose the truck box with the tarp or uncover the truck box.

U.S. Pat. No. 4,691,957 issued to Ellingson, outlines a tarp assembly for covering an open top of a truck trailer. The tarp has a longitudinal edge fixed to one side of the trailer. A roll bar secured to the free edge of the tarp is rotated with a crank rod to roll the tarp to an open position and unroll the tarp to a closed position. A hold bar fixed to the free edge of the tarp with a plurality of straps is adapted to engage hooks secured to a side of the trailer to hold the tarp in a closed position.

U.S. Pat. No. 6,224,139 issued to Weyand, outlines the use of a tarpaulin cover having a fabric cover sheet which has an elastic band extending around portions of its perimeter and contained in a hem. A number of spaced cutouts are provided along the hem for exposing the elastic band for tie down hooking and unhooking access. Opposite ends of the elastic cord are secured within the hem around respective rivets that in turn are secured to and passed through the hem with respective terminating ends of the elastic cord secured to itself, whereby opposite terminating loop ends of the elastic cord are secured respectively within the hem around these rivets.

Although each of these patents outline inventions that are useful and novel, what is really needed is a reusable protective covering that is used to protect a prefabricated home as it is being transported. The prefabricated home industry is growing in popularity and would benefit greatly from such an invention.

None of the above inventions and patents, taken either singularly or in combination, is seen to describe the instant invention as claimed. Thus a prefabricated home covering solving the aforementioned problems is desired.

SUMMARY OF THE INVENTION

The invention is a prefabricated home covering, designed to protect a prefabricated home as it is being transported. The prefabricated home covering has a generally rectangular sheet of tarpaulin material used to cover an open middle section of a prefabricated home half being transported. There are also two generally trapezoidal sheets of tarpaulin material used to cover the ends of a prefabricated home half being transported, with the generally rectangular sheet of tarpaulin material and the two generally trapezoidal sheets of tarpaulin material being attached from the bottom of a trailer frame transporting the prefabricated home half with a plurality of rubber straps and D-rings with S-hooks. A plurality of strap buckle assemblies attach the generally rectangular sheet of tarpaulin material to the two generally trapezoidal sheets of tarpaulin material and a plurality of grommets attach the prefabricated home covering to the prefabricated home being transported.

Accordingly, it is a principal object of the invention to provide a reusable protective covering that is used to protect a prefabricated home as it is being transported.

It is another object of the invention to provide a protective covering that is used to protect a prefabricated home as it is being transported that is easy and quick to install.

It is a further object of the invention to provide a protective covering for a prefabricated home that has no waste and is environmentally friendly.

Still another object of the invention is to provide a cost effective way to enclose and protect prefabricated homes as they are being transported.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
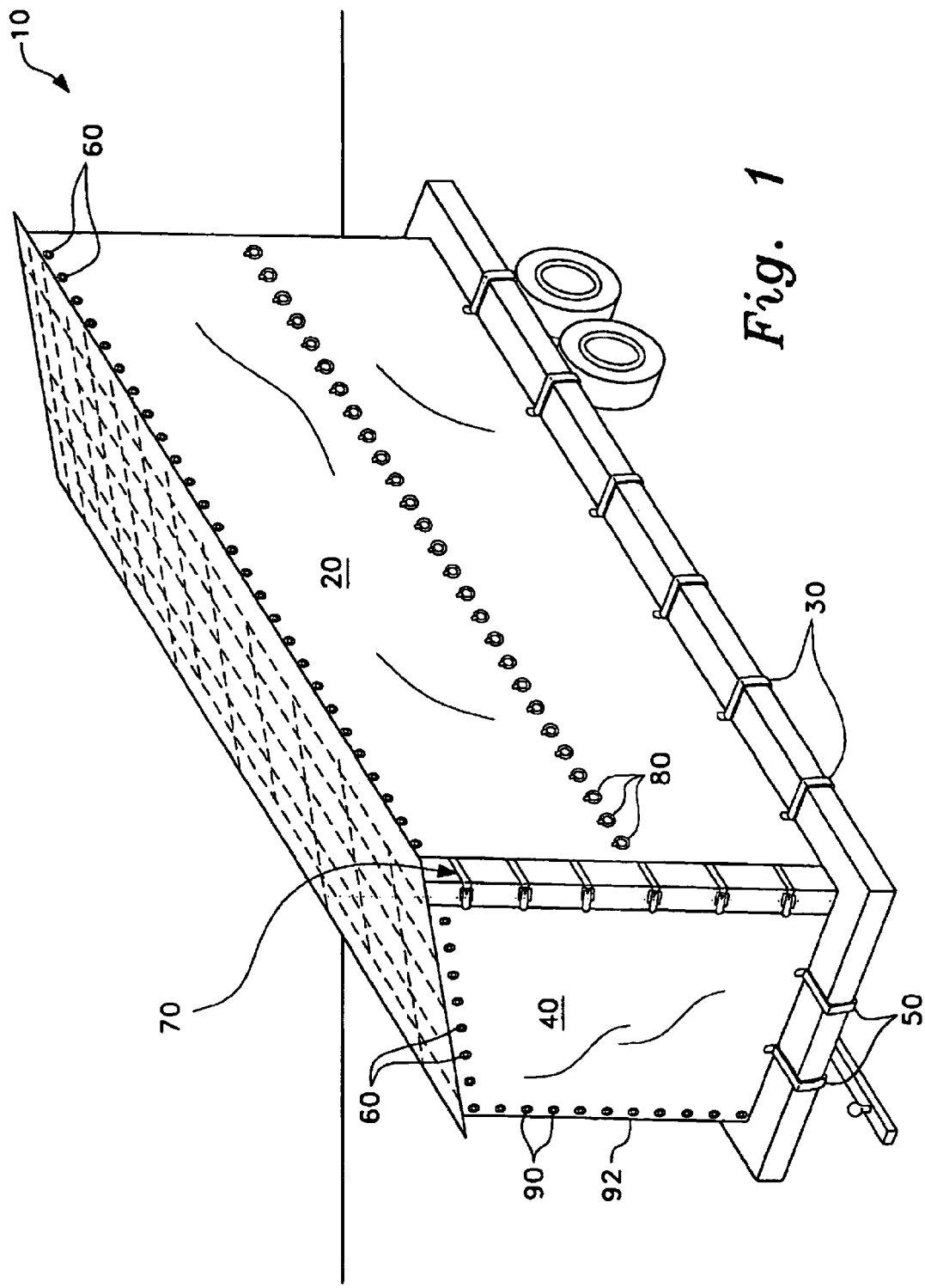
FIG. 1 is an environmental, perspective view of a prefabricated home being transported with a prefabricated home covering according to the present invention.

The present invention is a prefabricated home covering 10, designed to protect a prefabricated home as it is being transported. The prefabricated home covering 10 comprises one generally rectangular sheet of tarpaulin material 20 used to cover the middle section of the prefabricated home being transported. There are a plurality of rubber straps and D-rings provided with S-hooks 30 to hold the generally rectangular sheet of tarpaulin material 20 from the bottom of a transporting trailer. There are also two generally trapezoidal sheets of tarpaulin material 40 used to cover the ends of the prefabricated home being transported, which are also attached from the bottom of the trailer frame transporting the prefabricated home. There is a second plurality of rubber straps and D-rings provided with S-hooks 50 to hold the generally trapezoidal sheets of tarpaulin material 40 from the bottom of the transporting trailer.

There are a plurality of grommets 60 on the top edge of the generally rectangular sheet of tarpaulin material 20 to accommodate a plurality of nails or screws (not shown) that will be nailed through the plurality of grommets 60, that will hold the generally rectangular sheet of tarpaulin material 20 from the roof line of the prefabricated home.

The prefabricated home covering 10 also has a plurality of strap buckle assemblies 70 alternatingly attaching the sides of the generally rectangular sheet of tarpaulin material 20 with the sides of generally trapezoidal sheets of tarpaulin material 40, enclosing and protecting the sides of the prefabricated home while exposing the exterior siding of the prefabricated home across from the generally rectangular sheet of tarpaulin material 20. In other words, a generally trapezoidal sheet of tarpaulin material 40 will cover one of each of the end-sections of the prefabricated home and be attached with a strap buckle assembly 70 to the generally rectangular sheet of tarpaulin material 20 that will cover the middle section. The free end of the generally rectangular sheet of tarpaulin material 20 would then be attached to another generally trapezoidal sheet of tarpaulin material 40 that would be extended to cover the other end of the prefabricated home. The remaining generally trapezoidal sheet of tarpaulin material 40 would then cover the remaining end section of the prefabricated home and be attached to the free end of each of the generally rectangular sheet of tarpaulin material 20 with a strap buckle assembly 70, completing the entire prefabricated home covering 10. The prefabricated home covering 10 also has a plurality of rings 80 that are provided across the approximate middle of the generally rectangular sheet of tarpaulin material 20 to help secure the prefabricated home covering 10 while transporting the prefabricated home in windy conditions.

Figure 2:
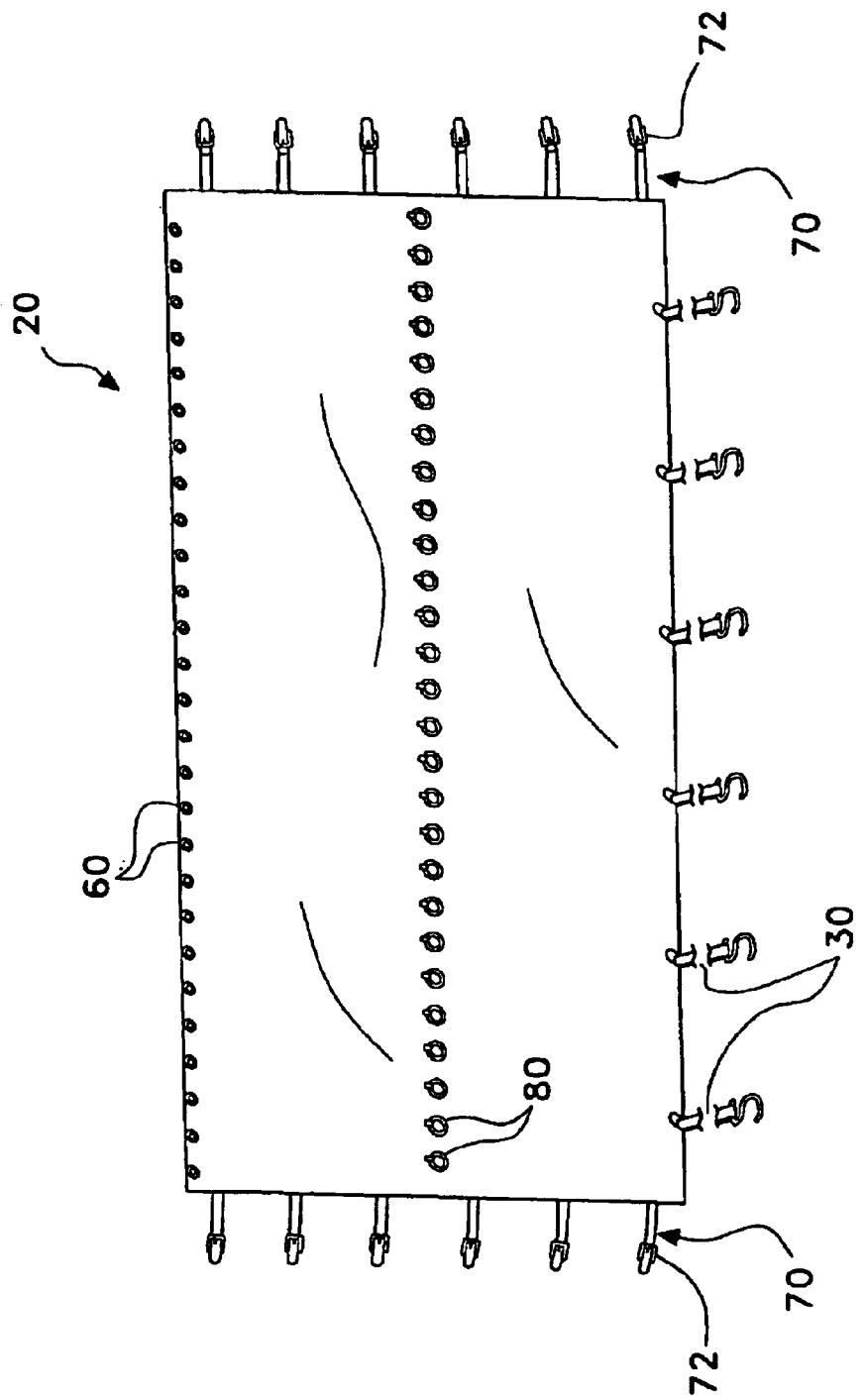
FIG. 2 is a front view of a middle section of a prefabricated home covering.

FIG. 2 depicts a generally rectangular sheet of tarpaulin material 20 used by the prefabricated home covering 10. There is only one generally rectangular sheet of tarpaulin material 20 used by the prefabricated home covering 10. The generally rectangular sheet of tarpaulin material 20 has a strap buckle assembly 70 on each side that provides a plurality of individual buckles 72 that will correspond to mate with a plurality of straps (FIG. 3) from each generally trapezoidal sheet of tarpaulin material 40. As discussed earlier, rubber straps and D-rings with S-hooks 30 are used to secure the bottom of the generally rectangular sheet of tarpaulin material 20 to a trailer frame and nails or wood screws (not shown) that will be nailed through the plurality of grommets 60, that will hold the generally rectangular sheet of tarpaulin material 20 from the roof line of the prefabricated home. A plurality of rings 80 can be used with a rope (not shown) to tie down the generally rectangular sheet of tarpaulin material 20 in windy conditions.

Figure 3:
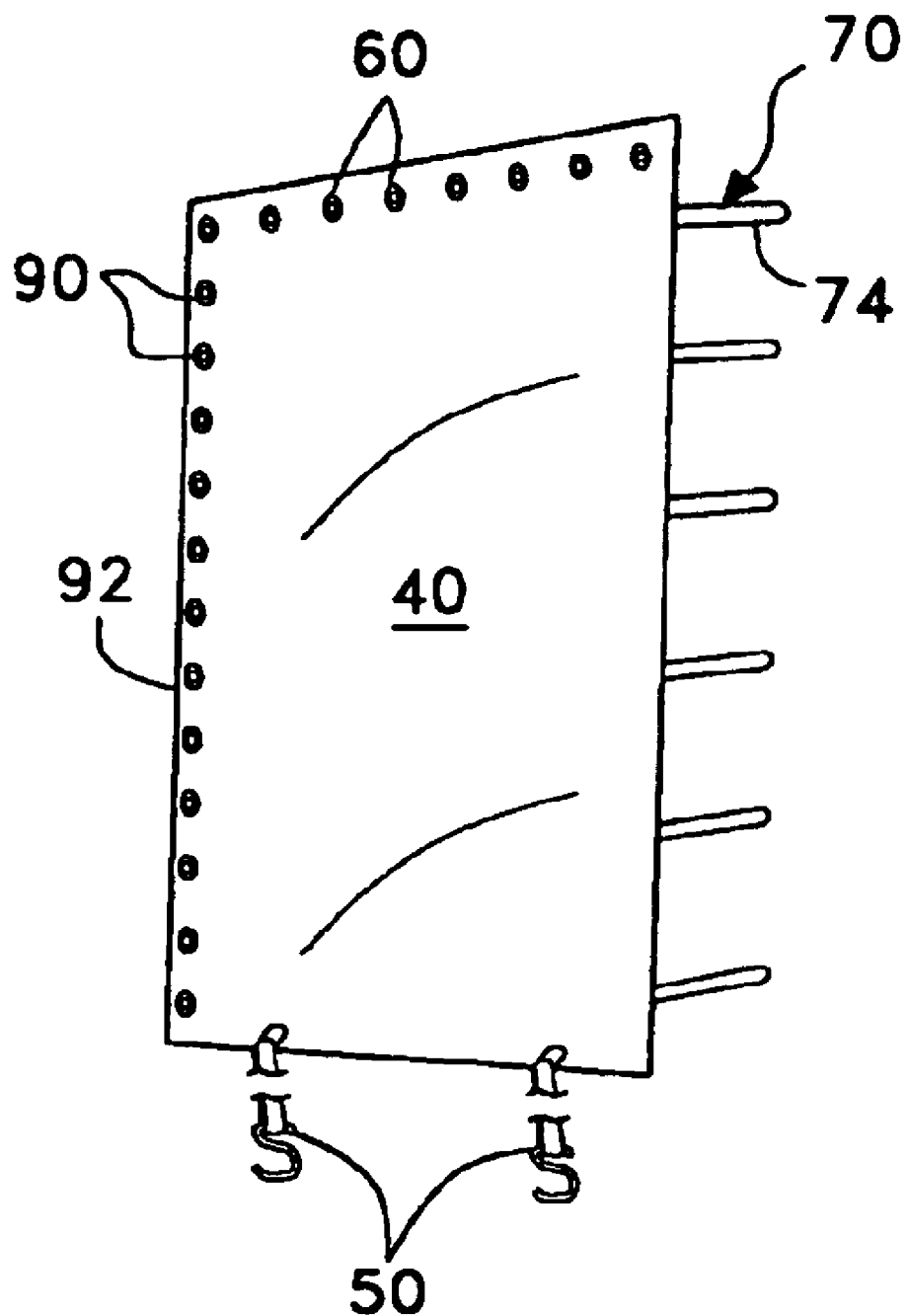
FIG. 3 is a front view of an end section of a prefabricated home covering.

FIG. 3 is an isolated depiction of the generally trapezoidal sheet of tarpaulin material 40. The top of the generally trapezoidal sheet of tarpaulin material 40 is provided with grommets 60 to accommodate a plurality of nails or screws that will be nailed through the plurality of grommets 60 to secure the top of the generally trapezoidal sheet of tarpaulin material 40. An additional plurality of grommets 90 are provided on a vertical edge 92 opposite the strap buckle assembly 70 of the generally trapezoidal sheets of tarpaulin material 40. This is to accommodate an additional plurality of nails or screws that will be nailed through the plurality of grommets 90, that will hold the generally trapezoidal sheets of tarpaulin material 40 at the vertical edge 92 opposite the strap buckle assembly 70.

The strap end 74 of the strap buckle assembly 70 is attached to the generally trapezoidal sheet of tarpaulin material 40 and is mated with buckles 72 from the strap buckle assembly 70 of the generally rectangular sheet of tarpaulin material 20. The tension on the strap buckle assembly 70 is manually adjustable with a tine and coordinated set of holes (not shown) and is well-known to those schooled in the related art. Like the generally rectangular sheet of tarpaulin material 20, the generally trapezoidal sheets of tarpaulin material 40 are also secured with an additional plurality of rubber straps and D-rings with S-shaped hooks 50 that grasp the frame of the trailer transporting a prefabricated home.

The prefabricated home covering 10 has a generally rectangular sheet of tarpaulin material 20 and two generally trapezoidal sheets of tarpaulin material 40 that are made of vinyl, and are intended to be durable enough for reusable usage. Adjustments with the rubber straps and D-rings with S-hooks 30, 50 and the strap buckle assemblies 70 are done manually and nails and wood screws can be hammered through any provided grommets 60, 90 to secure the generally rectangular sheet of tarpaulin material 20 and the two generally trapezoidal sheets of tarpaulin material 40 to the trailer carrying the prefabricated home.

It is to be understood that the present invention is not limited to the embodiment described above, but encompasses any and all embodiments within the scope of the following claims.

I claim:

1. A prefabricated home covering for protecting a prefabricated home half during transport, said covering comprising:

a generally rectangular sheet of tarpaulin material adapted for covering an open middle section of the prefabricated home half, said generally rectangular sheet of tarpaulin material having a top edge, opposing side edges, a bottom edge and a transverse midline;

two generally trapezoidal sheets of tarpaulin material adapted for covering the ends of the prefabricated home half, each of said trapezoidal sheets of tarpaulin material having a top edge, vertical side edges and a bottom edge;

a plurality of rubber straps and D-rings with S-shaped hooks attached along the bottom edge of the generally rectangular sheet of tarpaulin material and along the bottom edge of each of the generally trapezoidal sheets of tarpaulin material, the plurality of rubber straps and D-rings with S-shaped hooks being adapted for securement to a trailer frame;

a first plurality of grommets disposed along the top edge of the generally rectangular sheet of tarpaulin material and along the top edge of the generally trapezoidal sheets of tarpaulin material for securing the generally rectangular sheet of tarpaulin material and generally trapezoidal sheets of tarpaulin material along a roof line of the prefabricated home half;

a plurality of rings disposed across approximately the midline of the generally rectangular sheet of tarpaulin material to further secure the generally rectangular sheet of tarpaulin material while transporting the prefabricated home half in windy conditions; and a plurality of strap buckle assemblies attached along the opposing side edges of the generally rectangular sheets of tarpaulin material and attached along one of the vertical side edges of each of the generally trapezoidal sheets of tarpaulin material.

2. The prefabricated home covering according to claim 1, wherein a second plurality of grommets are disposed along another of the vertical side edges of each of the generally trapezoidal sheets of tarpaulin material.

3. The prefabricated home covering according to claim 1, wherein the generally rectangular sheets of tarpaulin material and the generally trapezoidal sheets of tarpaulin material are made of vinyl.

* * * * *